Figure 1:
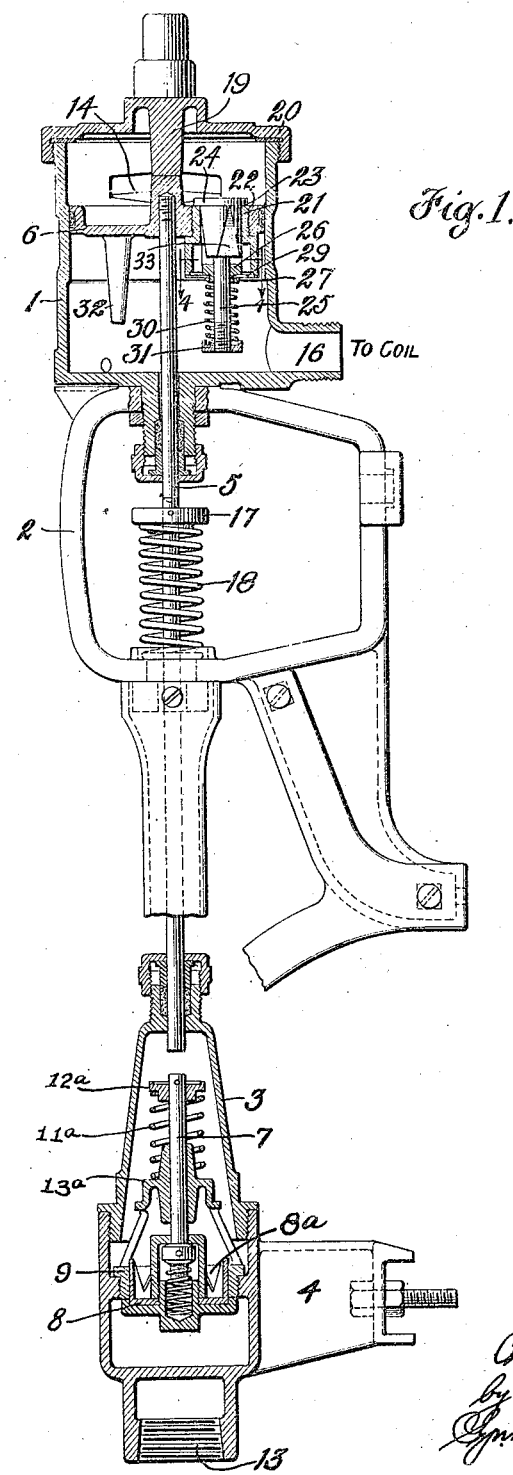

Oct. 7, 1924.
C. O. SCHOLZ
1,510,801
WATER VALVE FOR INSTANTANEOUS WATER HEATERS
Filed Dec. 16, 1919
2 Sheets-Sheet 1

WITNESS
INVENTOR.

Oct. 7, 1924.  
C. O. SCHOLZ  
1,510,801  
WATER VALVE FOR INSTANTANEOUS WATER HEATERS  
Filed Dec. 16, 1919  2 Sheets-Sheet 2
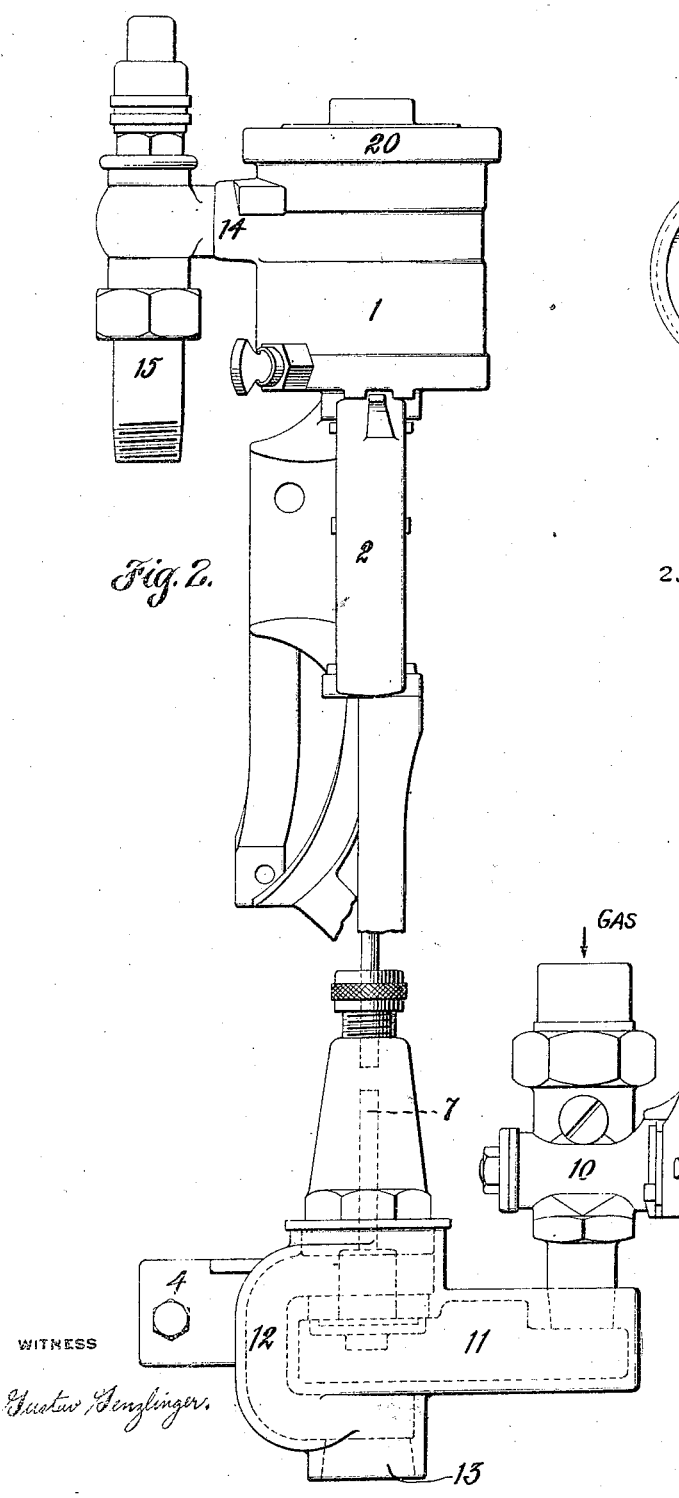
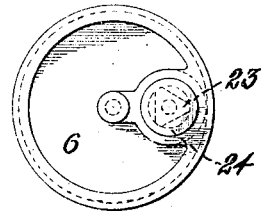
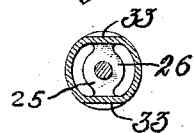
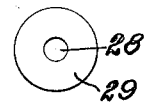

Patented Oct. 7, 1924.

1,510,801

UNITED STATES PATENT OFFICE.

CHARLES O. SCHOLZ, OF PITTSBURGH, PENNSYLVANIA, ASSIGNOR TO PITTSBURG WATER HEATER COMPANY, A CORPORATION OF NEW JERSEY.

WATER VALVE FOR INSTANTANEOUS WATER HEATERS.

Application filed December 16, 1919. Serial No. 345,357.

*To all whom it may concern:*

Be it known that I, CHARLES O. SCHOLZ, a citizen of the United States, residing at Pittsburgh, in the county of Allegheny and State of Pennsylvania, have invented certain new and useful Improvements in Water Valves for Instantaneous Water Heaters, of which the following is a specification.

This invention relates to water or pressure valves for instantaneous water heaters and it has for its primary objects; the provision of an improved and simplified graduated valve which can be cheaply constructed and easily replaced with a minimum of trouble and expense when worn out; the provision of a valve so constructed that the piston or plunger will be automatically moved to closed position in order to permit the closing of the gas valve when the water delivery from the heater is shut off; the provision of a simple safety device which will ensure the apparatus against overheating and explosion; the provision of an improved valve construction so built that the graduated valve, complete with its safety device, may be replaced without the necessity of renewing the water valve piston; the provision of a water valve that requires practically no adjustment; and the provision of a graduated plug valve and water piston which may be readily assembled as a single unit, thereby avoiding any chance of the plug valve ever being out of alinement with its hole. These objects and advantages together with such others as may hereinafter appear in connection with a description of the accompanying drawings will be more clearly understood below.

Figure 1 is a longitudinal section through the water and gas valves employed; Figure 2 is a side elevation of the water and gas valves employed; Figure 3 is a plan view of the water piston and graduated valve; Figure 4 is a section on the line 4—4 of Figure 1; and Figure 5 is a plan view of a check valve disc.

In devices of this character, the water valve consists primarily of a piston which is adapted to move back and forth between the inlet and outlet openings of a water casing, the piston moving toward the outlet opening upon the turning on of a hydrant in the water supply system, and being returned to the inlet side of the casing by means of a spring or other automatic device when the hydrant is turned off. This movement of the piston accomplishes two results; first, it opens a valve so that water from the main may flow through the water casing to the coil of the hot water heater and from thence to the hydrant or faucet in the heating system; and, at the same time, it opens a gas valve which controls the supply of gas to the hot water heater, the opening of the gas valve being in proportion to the opening of the water valve. Heretofore it has been customary to construct a water valve with some of its parts at least mounted on or associated with some part of the piston casing. The piston moved away from a tapered plug thus establishing flow from the inlet to the outlet port of the casing,—the greater the movement the greater the flow of water. When the parts became worn, it was necessary not only to renew the graduated plug, but also the piston itself; and upon inserting a new piston, it was always necessary to readjust the stem which it carried for operating the gas valve. All this involved considerable expense for new parts as well as considerable time, and it frequently was necessary to employ the services of a workman more or less skilled. It is the primary object of my invention to provide a water valve construction which will eliminate the expense involved in making repairs both as to labor and as to parts.

In the apparatus here illustrated, the water valve casing or chamber 1 is supported by any suitable bracket 2 in such position with respect to the gas valve casing 3, supported by the bracket 4, that the stem 5 carried by the water valve piston 6 will project into the gas valve casing 3 so that, upon movement of the water piston 6, the stem will abut against the stem 7 of the gas valve 8 thereby causing it to open. The gas valve consists primarily of a piston provided with V-shaped slots 8$^a$ which are uncovered from the point outward as the piston valve 8 moves downwardly within the ring 9,—thus allowing gas to flow in from the main through the cock 10, chamber 11, up through the valve and around by way of passage 12 to the outlet 13 which leads to the burners of the hot water heater. The valve 8 is rendered self-closing by a helical compression spring 11$^a$ interposed between a collar 12$^a$ on the upper end of the valve stem 7 and a fixed guide structure 13$^a$ for the latter.

The water from the supply main enters the casing 1 at a point above the piston 6 through an inlet opening 14, to which is connected a water supply pipe 15. Water leaves the casing 1 through the outlet 16 which leads to the coil of the hot water heater and from thence to the hot water supply system, at various points in which may be located hot water faucets.

The stem 5 is provided with a ring or collar 17 between which and the bracket 2 is located a spring 18 which is adapted to normally hold the piston with its rod 5 in upper position. Movement of the piston upwardly is limited by the stop 19 on the interior of the housing cap 20, this stop preventing the piston 6 from at any time, covering the inlet 14. When a hot water faucet is turned on at some point in the hot water supply system, the pressure below the piston 6 will be reduced to a point where the pressure above it coming from the main will be greater than the pressure of the spring 18. The piston will then travel downwardly and in so travelling the stem 5 will open the gas valve in the manner hereinbefore stated.

When the piston thus moves downwardly and the gas valve is opened, communication between the space above the piston with that below it, with its consequent flow of water to the coil of the heater and out through the faucet, is established in the following manner. An open ended housing or plug 21 is screw threaded or otherwise secured in the aperture or hole 22 in the piston 6, and this housing carries the bevelled plug 23 provided with the flange 24 at its upper end and a downwardly projecting stem 25 at its lower end. The lower portion of the housing 21 is provided with the spider 26 from which projects downwardly a boss 27 which fits into the central opening 28 of the safety washer or disc 29. The stem 25 extends down through the spider and boss and mounted on this stem 25 is a spring 30 held in place between the disc 29 and an adjusting nut 31 threaded upon the end of the stem. This spring normally holds the disc 29 in upper position, thereby closing the lower end of the housing, against upward flow of water, but not preventing the disc from opening under water pressure from above.

Normally the bevelled plug 23 is in closed position thereby closing off communication between the inlet and outlet ports of the casing 1, but upon downward movement of the piston 6, the end of the stem 25 will abut against the bottom of the casing, thereby holding the plug against any further downward movement, and as the piston 6 moves downwardly it will uncover the bevelled edges of the plug thus permitting a flow of water from the inlet to the outlet. The volume of which will be in proportion to the distance traversed by the piston. Downward movement of the piston is preferably limited by means of a suitable stop 32. There may be one of more of these stops as seems desirable, and they may be carried either on the piston or on the casing.

The water readily flows from the inlet opening to the outlet port past the disc 29 against the pressure of the spring 30, the disc acting as a check valve which permits flow of water downwardly to the outlet opening but not in the reverse direction.

The outer surface of the lower end of the housing 21 is provided with the flatted portions 33 for convenient application of a wrench.

Briefly summed up, the operation of the device is as follows: When water is drawn from a hot water faucet at some point in the distributing system, the piston 6 moves downwardly due to the fall in pressure below it, and when the stem 25 engages the bottom of the casing 1, the piston will, upon further downward movement, open the plug valve 23, thereby allowing water to flow in from the inlet 14, down past the check valve 29 and out through the opening 16. At the same time the stem 5 opens the gas valve in the manner previously described and the water which is flowing through the coil in the heater will be heated by the gas as it is burned. As soon as the faucet is turned off the spring 18 will return the piston 6 to its upper position and thereby permit both the water valve and the gas valve to close and to remain closed until such time as hot water is again desired.

In the operation of the device, should steam at any time be generated in the heater coil, the pressure will be communicated to the underside of the piston 6 and disc 29. This pressure will close the check valve and force the piston upwardly thereby allowing the gas valve to close and cut off the supply to the heater. It will thus be seen that the construction is such as to prevent undue heating of the water or the accumulation of steam with a consequent danger of explosion.

When the parts of the water valve become worn and it is necessary to replace them, the cap 20 that serves as closure for the opening to the casing 1 at that end is unscrewed, the piston removed, the old housing which carries all the valve parts removed, and a new one screwed into its place, after which the piston is replaced and the cap 20 once more screwed on. No adjustment of the gas valve operating stem is required and no new piston or piston packing is made necessary, and inasmuch as the water plug and the housing which carries it are assembled as a unitary structure, there is no liability of the plug being out of alinement with its hole, as often happens in constructions where the plug is carried by the casing and projects therefrom into the hole in the piston. The valve device or water control assembly is simply and cheaply constructed, is positive and efficient in its operation, and as pointed out is easily removed as a unit when worn and replaced with a new one. It should be particularly noted that all these advantages are due to the fact that all of the water valve parts are carried in the removable housing 21 constituting therewith a unitary structure or assembly, as already pointed out. Replacement is accomplished in much the same manner and with the same ease in which an automobile spark plug is removed and replaced. The expense and time incident to making repairs are reduced to a minimum inasmuch as it is not necessary, as it has been heretofore, to renew the piston and its packing in addition to the valve parts, nor to make any careful or accurate adjustments of the parts in reassembling them.

I claim:

1. In a valve mechanism for an instantaneous water heater, the combination with an apertured water actuated control piston operating in a cylinder having a removable closure affording access thereto, of an open-ended housing removably mounted in the piston aperture, and a movable valve for normally closing said aperture, definitely carried and retained by said housing even when the latter is removed, and adapted to be opened for passage of water from inlet to outlet side of the piston upon movement thereof; said housing and valve thus constituting an essentially unitary assembly readily replaceable as such without renewal of the piston.

2. In a valve mechanism for an instantaneous water heater, the combination with an apertured water actuated control piston operating in a cylinder having a removable closure affording access thereto, of a device for controlling the piston aperture comprising an open-ended housing removably fitted therein, a disk for closing said aperture carried by said housing, and a spring also carried thereby for normally holding said disk in closed position to act as a check valve for preventing back flow of water from outlet to inlet side of the piston; the entire device being unitarily replaceable without renewal of the piston.

3. In a valve mechanism for an instantaneous water heater, the combination with an apertured water actuated control piston operating in a cylinder having a removable closure affording access thereto, of an open-ended housing removably mounted in the piston aperture, a plug valve for controlling passage of water through said aperture carried by said housing and having a stem for opening the valve upon engagement with the chamber wall, a disk mounted for sliding movement relatively to said stem and adapted to close said aperture, and a spring for normally holding said disk in closed position; housing, valve, disk, and spring constituting an assembly readily removable without disturbance of the piston.

4. As an article of manufacture, a water valve device, for an apertured gas water heater control piston operating in a cylinder with removable closure means affording access thereto; said water valve device comprising an open-ended housing adapted to be removably mounted in the opening of such piston, and valve parts carried and definitely retained by said housing even on its removal from such a piston, and thus constituting with said housing an essentially unitary assembly, readily removable and replaceable as such.

5. A water valve device, for an apertured gas water heater control piston operating in a cylinder with removable closure means affording access thereto; said water valve device comprising an open-ended housing adapted to be removably mounted in the opening of such piston, a plug mounted in said housing, a screw threaded stem on the plug, a check valve disk, a spring on said stem bearing against the disk, and a nut screwed on the stem engaging the spring; the device being readily replaceable without renewal of the piston.

In testimony whereof, I have hereunto signed my name.

CHARLES O. SCHOLZ.